(12) United States Patent
Derbeko et al.

(10) Patent No.: US 8,554,954 B1
(45) Date of Patent: Oct. 8, 2013

(54) SYSTEM AND METHOD FOR IMPROVING CACHE PERFORMANCE

(75) Inventors: Philip Derbeko, Modiin (IL); Constantine Antonovich, Ramat Gan (IL); Alexandr Veprinsky, Brookline, MA (US); Arieh Don, Newton, MA (US); Kevin Martin, Dracut, MA (US)

(73) Assignee: EMC Corporation, Hopkinton, MA (US)

( * ) Notice: Subject to any disclaimer, the term of this patent is extended or adjusted under 35 U.S.C. 154(b) by 21 days.

(21) Appl. No.: 13/436,918

(22) Filed: Mar. 31, 2012

(51) Int. Cl.
*G06F 3/00* (2006.01)

(52) U.S. Cl.
USPC .............................................. 710/5; 713/193

(58) Field of Classification Search
None
See application file for complete search history.

(56) References Cited

U.S. PATENT DOCUMENTS

| | | | |
|---|---|---|---|
| 2002/0083285 A1* | 6/2002 | Sanada et al. | 711/163 |
| 2005/0172052 A1* | 8/2005 | Sanada et al. | 710/36 |
| 2010/0174921 A1* | 7/2010 | Abzarian et al. | 713/193 |
| 2010/0241807 A1* | 9/2010 | Wu et al. | 711/118 |
| 2011/0208940 A1* | 8/2011 | Naganuma et al. | 711/170 |
| 2013/0013285 A1* | 1/2013 | Cyr et al. | 703/25 |

* cited by examiner

*Primary Examiner* — Elias Mamo
(74) *Attorney, Agent, or Firm* — Brian J. Colandreo; Mark H. Whittenberger; Holland & Knight LLP

(57) ABSTRACT

A method, computer program product, and computing system for determining at least one LUN that was being controlled by a host prior to a crash event concerning the host, thus define at least one target LUN. A Mode Select command is prepared for the at least one target LUN, wherein the Mode Select command defines control information and host identifier information concerning the host. The Mode Select command is processed to determine if the control information and host identifier information included within the Mode Select command matches control information and host identifier information included within a buffer associated with the at least one target LUN. If the control information and host identifier information included within the Mode Select command matches the control information and host identifier information included within the buffer, control of the at least one target LUN is granted to the host.

21 Claims, 7 Drawing Sheets

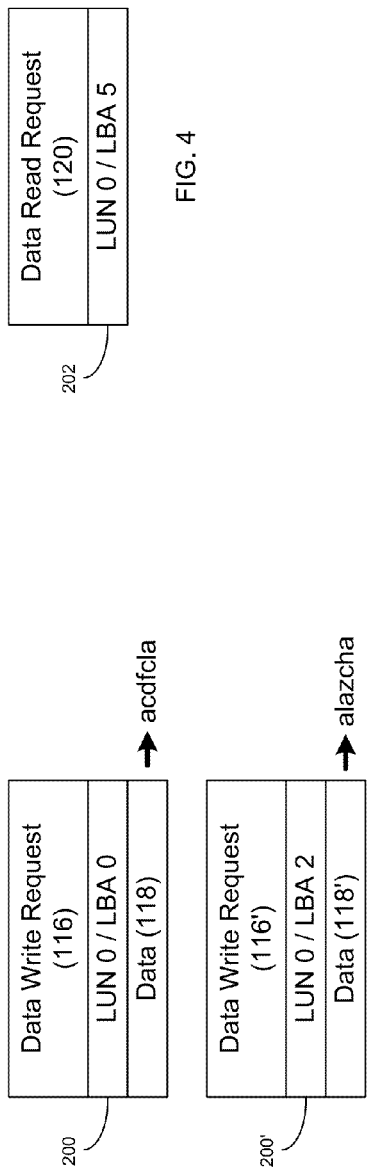

SYSTEM AND METHOD FOR IMPROVING CACHE PERFORMANCE

TECHNICAL FIELD

This disclosure relates to cache memory systems and, more particularly, to systems and methods for improving the performance of cache memory systems.

BACKGROUND

Storing and safeguarding electronic content is of paramount importance in modern business. Accordingly, various systems may be employed to protect such electronic content.

The use of solid-state storage devices is increasing in popularity. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF DISCLOSURE

In a first implementation, a computer-implemented method includes determining at least one LUN that was being controlled by a host prior to a crash event concerning the host, thus define at least one target LUN. A Mode Select command is prepared for the at least one target LUN, wherein the Mode Select command defines control information and host identifier information concerning the host. The Mode Select command is processed to determine if the control information and host identifier information included within the Mode Select command matches control information and host identifier information included within a buffer associated with the at least one target LUN. If the control information and host identifier information included within the Mode Select command matches the control information and host identifier information included within the buffer, control of the at least one target LUN is granted to the host.

One or more of the following features may be included. If the control information and host identifier information included within the Mode Select command does not match the control information and host identifier information included within the buffer, control of the at least one target LUN may be denied to the host. If the control information and host identifier information included within the Mode Select command does not match the control information and host identifier information included within the buffer, the host may be notified. The execution of a reboot sequence of the host after the crash event may be sensed.

The at least one target LUN may be included within a data array. The data array may include one or more electro-mechanical storage devices. The host may be an application server.

In another implementation, a computer program product resides on a computer readable medium that has a plurality of instructions stored on it. When executed by a processor, the instructions cause the processor to perform operations including determining at least one LUN that was being controlled by a host prior to a crash event concerning the host, thus define at least one target LUN. A Mode Select command is prepared for the at least one target LUN, wherein the Mode Select command defines control information and host identifier information concerning the host. The Mode Select command is processed to determine if the control information and host identifier information included within the Mode Select command matches control information and host identifier information included within a buffer associated with the at least one target LUN. If the control information and host identifier information included within the Mode Select command matches the control information and host identifier information included within the buffer, control of the at least one target LUN is granted to the host.

One or more of the following features may be included. If the control information and host identifier information included within the Mode Select command does not match the control information and host identifier information included within the buffer, control of the at least one target LUN may be denied to the host. If the control information and host identifier information included within the Mode Select command does not match the control information and host identifier information included within the buffer, the host may be notified. The execution of a reboot sequence of the host after the crash event may be sensed.

The at least one target LUN may be included within a data array. The data array may include one or more electro-mechanical storage devices. The host may be an application server.

In another implementation, a computing system includes at least one processor and at least one memory architecture coupled with the at least one processor, wherein the computing system is configured to perform operations including determining at least one LUN that was being controlled by a host prior to a crash event concerning the host, thus define at least one target LUN. A Mode Select command is prepared for the at least one target LUN, wherein the Mode Select command defines control information and host identifier information concerning the host. The Mode Select command is processed to determine if the control information and host identifier information included within the Mode Select command matches control information and host identifier information included within a buffer associated with the at least one target LUN. If the control information and host identifier information included within the Mode Select command matches the control information and host identifier information included within the buffer, control of the at least one target LUN is granted to the host.

One or more of the following features may be included. If the control information and host identifier information included within the Mode Select command does not match the control information and host identifier information included within the buffer, control of the at least one target LUN may be denied to the host. If the control information and host identifier information included within the Mode Select command does not match the control information and host identifier information included within the buffer, the host may be notified. The execution of a reboot sequence of the host after the crash event may be sensed.

The at least one target LUN may be included within a data array. The data array may include one or more electro-mechanical storage devices. The host may be an application server.

The details of one or more implementations are set forth in the accompanying drawings and the description below. Other features and advantages will become apparent from the description, the drawings, and the claims.

BRIEF DESCRIPTION OF THE DRAWINGS

FIG. 3 is a diagrammatic view of a data write request for use with the data caching process of FIG. 1;

FIG. 4 is a diagrammatic view of a data read request for use with the data caching process of FIG. 1;

FIG. 5 is a diagrammatic view of a content directory for use with the data caching process of FIG. 1;

Like reference symbols in the various drawings indicate like elements.

DETAILED DESCRIPTION OF THE PREFERRED EMBODIMENTS

Figure 1:
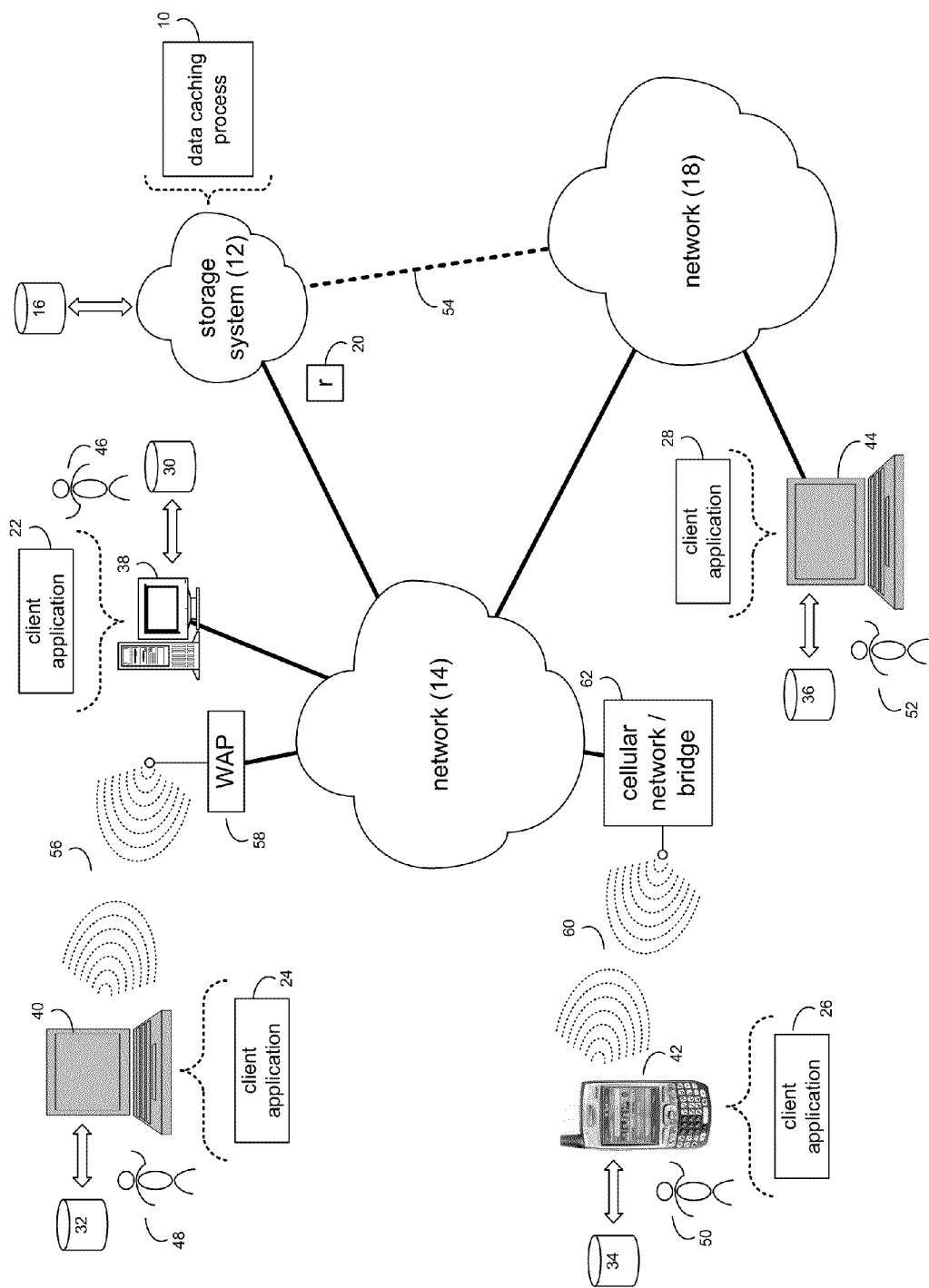
FIG. 1 is a diagrammatic view of a storage system and a data caching process coupled to a distributed computing network.

General Information:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

System Overview:

Referring to FIG. 1, there is shown data caching process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of data caching process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage system 12. Examples of data request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Client electronic devices 38, 40, 42, 44 may each execute an operating system, examples of which may include but are not limited to Microsoft Windows™, Microsoft Windows CE™, Redhat Linux™, or a custom operating system.

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Data Caching Process:

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
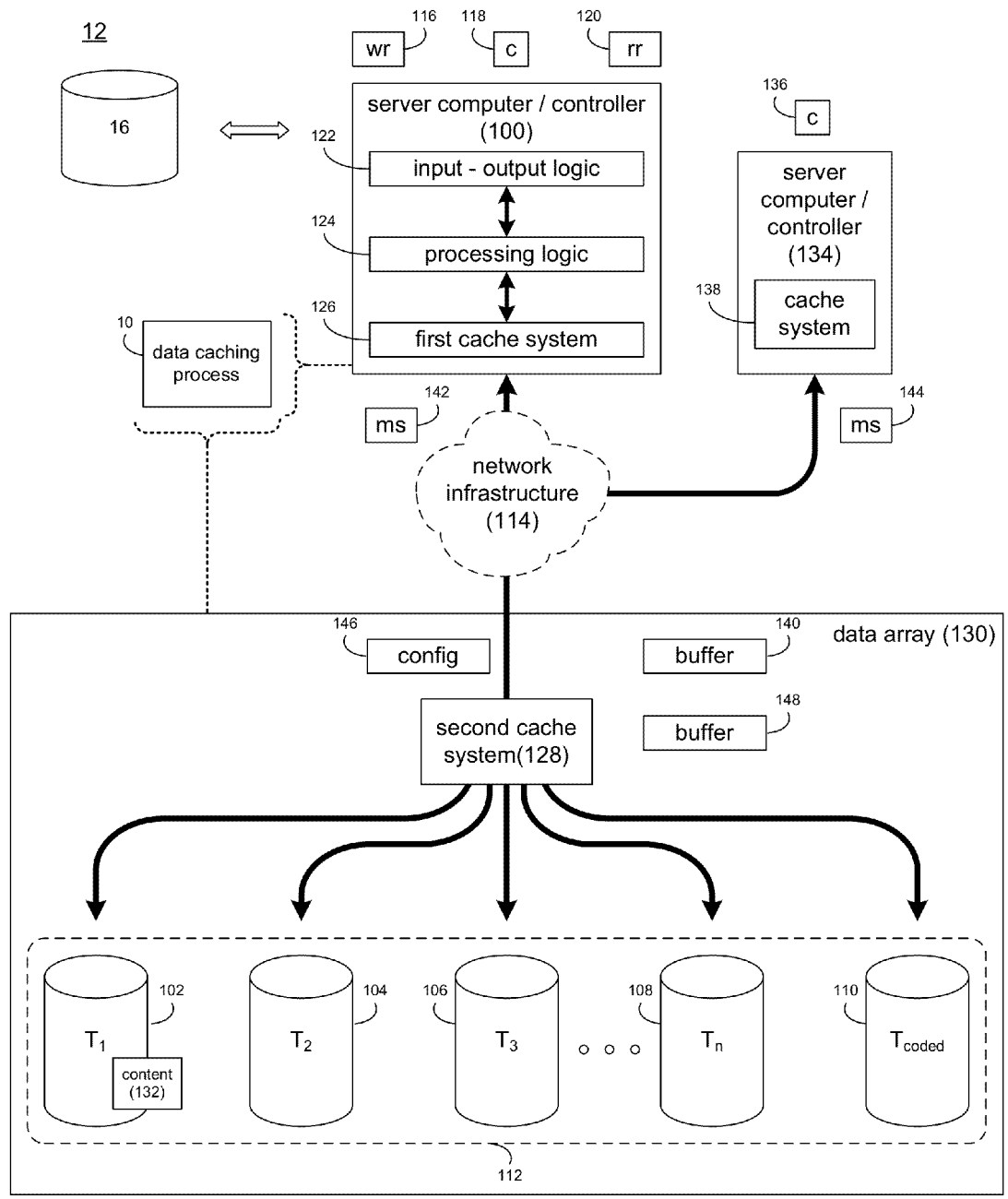
FIG. 2 is a diagrammatic view of the storage system of FIG. 1.
Figure 6:
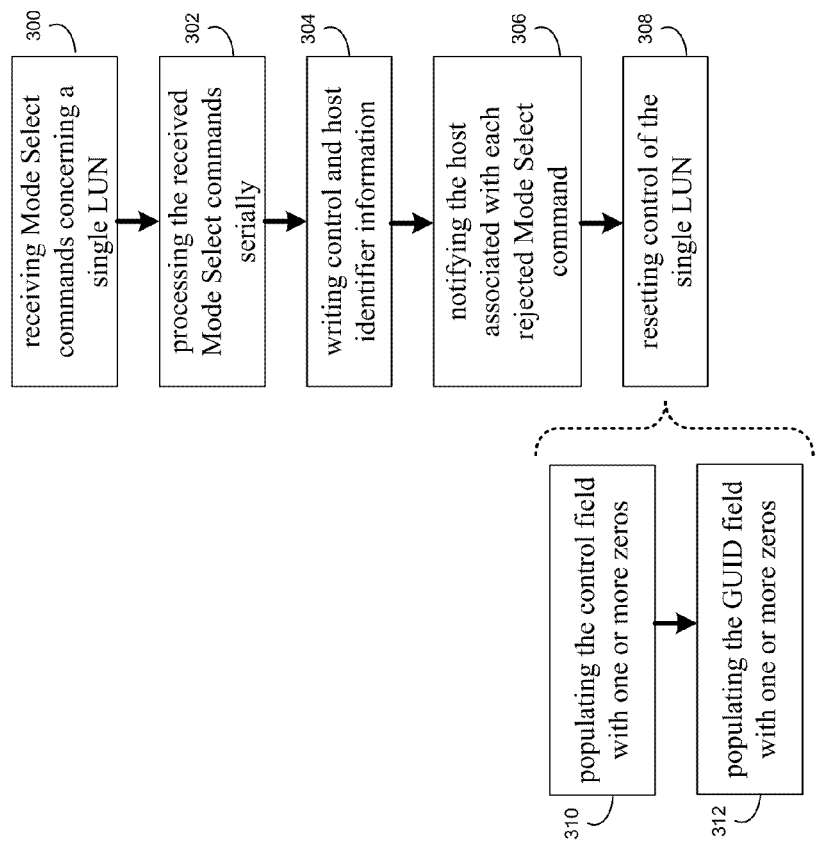
FIG. 6 is a first flow chart of the data caching process of FIG. 1.
Figure 7:
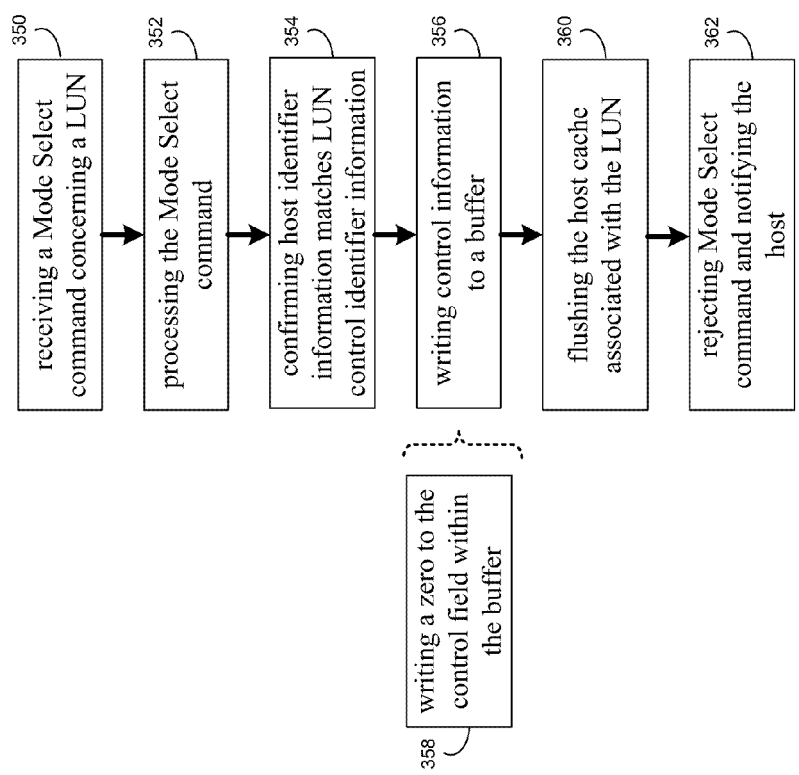
FIG. 7 is a second flow chart of the data caching process of FIG. 1.
Figure 8:
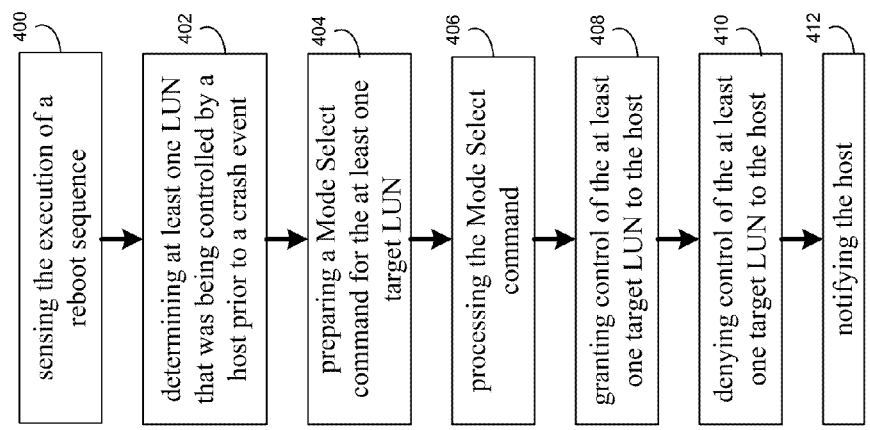
FIG. 8 is a third flow chart of the data caching process of FIG. 1.
Figure 9:
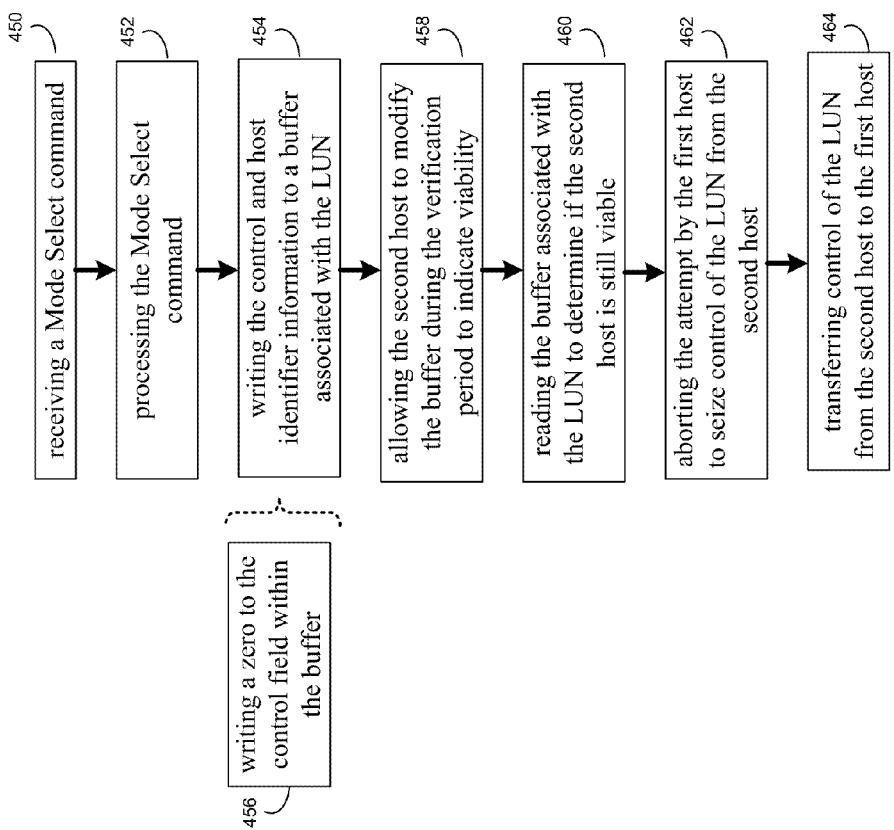
FIG. 9 is a fourth flow chart of the data caching process of FIG. 1.

Referring also to FIG. 2, storage system 12 may include a server computer/controller (e.g. server computer/controller 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of data caching process 10. The instruction sets and subroutines of data caching process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various data requests (e.g. data request 20) may be generated. For example, these data requests may be sent from client applications 22, 24, 26, 28 to storage system 12. Additionally/alternatively and when server computer/controller 100 is configured as an application server, these data requests may be internally generated within server computer/controller 100. Examples of data request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or a NAS/SAN controller, processing logic 124 may calculate and store coded data on coded target 110. However, if processing logic 124 was included within e.g., an application server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of data requests (e.g., data request 20), the overall performance of storage system 12 may be enhanced. As will be described below in greater detail, first cache system 126 may be a content-aware cache system.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of data requests (e.g., data request 20), the overall performance of storage system 12 may be enhanced. As will be described below in greater detail, second cache system 128 may be a content-aware cache system.

As discussed above, the instruction sets and subroutines of data caching process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of data caching process 10 may be executed by one or more processors (not shown) and one or more memory architectures (not shown) included within data array 130.

Referring also to FIGS. 3-4, data request 20 (e.g. data read request 116 and/or data write request 120) may be processed by server computer/controller 100 to extract pertinent information concerning these data requests.

When data request 20 is a data write request (e.g., write request 116), write request 116 may include content 118 to be written to data array 130. Additionally, write request 116 may include a storage address 200 that defines the intended storage location within storage array 130 at which content 118 is to be stored. For example, storage address 200 may define a particular logical unit within data array 130 (e.g., a LUN or Logical Unit Number) and a particular storage address within that specific logical unit (e.g., an LBA or Logical Block Address) for storing content 118.

Concerning read request 120, these requests do not include any content to be written to data array 130, as these are read requests and concern content to be read from data array 130. Read request 120 may include a storage address 202 that defines the storage location within storage array 130 from which content is to be retrieved. For example, storage address 202 may define a particular logical unit within data array 130 (e.g., a LUN or Logical Unit Number) and a particular storage address within that specific logical unit (e.g., an LBA or Logical Block Address) for retrieving the content sought from data array 130.

As will be discussed below in greater detail and referring also to FIG. 5, data caching process 10 may maintain content directory 250, which may be used to locate various pieces of content within first cache system 126. In one particular embodiment of content directory 250, content directory 250 may include plurality of entries 252, wherein each of these entries may identify: data array storage address 200/202 (e.g. a logical storage unit and a storage address at which a specific piece of previously-written content is located within storage array 130); first cache address 254 (e.g., the location within first cache system 126 at which the specific piece of previously-written content is also located), and content identifier 256 for the specific piece of previously-written content. Accordingly, content directory 250 may identify the location of specific pieces of content included within first cache system 126 and their corresponding pieces of data within data array 130, as well as a content identifier that uniquely identifies the specific piece of content.

Content identifier 256 may be used in a content-aware caching system and may, specifically, be a mathematical representation of the specific piece of previously-written content that may allow e.g. server computer/controller 100 to quickly determine whether two pieces of previously-written content are identical, as identical pieces of content would have identical content identifiers. In one particular embodiment, content identifier 256 may be a hash function (e.g., a cryptographic hash) of the previously-written content. Accordingly, through the use of a content-aware caching system, duplicate data entries within first cache system 126 and/or second cache system 128 may be quickly identified, avoided, and/or eliminated.

As is known in the art, a hash function is an algorithm/subroutine that maps large data sets to smaller data sets. The values returned by a hash function are typically called hash values, hash codes, hash sums, checksums or simply hashes. Hash functions are mostly used to accelerate table lookup or data comparison tasks such as e.g., finding items in a database and detecting duplicated or similar records in a large file.

General Read Request Processing:

During operation of server computer/controller 100, data caching process 10 may receive read request 120 on first cache system 126, wherein read request 120 identifies previously-written content (as defined by storage address 202) included within data array 130.

For example, assume that user 46 is using client application 22 to access data (i.e. content 132) that is currently being stored on data array 130. Accordingly, client application 22 may generate read request 120 which, as discussed above, may define a particular logical unit within data array 130 (e.g., a LUN or Logical Unit Number) and a particular storage address within that specific logical unit (e.g., an LBA or Logical Block Address) for retrieving content 132 sought from data array 130 by client application 22.

Assume that read request 120 defines LUN0/LBA5 as the location of content 132 within data array 130. Upon receiving read request 120, data caching process 10 may compare the location of content 132 within data array 130 (namely LUN0/LBA5) with each of the plurality of entries 252 defined within content directory 250 to determine if a copy of content 132 is locally available (i.e., cached) within first cache system 126. If LUN0/LBA5 was defined within content directory 250 (meaning that a local cached copy of content 132 is present/available within first cache system 126), that particular entry would also define a corresponding first cache address (e.g. first cache address 254) within first cache system 126 at which content 132 would be locally-available and retrievable from the first cache system 126. Conversely, in the event that LUN0/LBA5 is not defined within content directory 250 (meaning that a local cached copy of content 132 is not present/available within first cache system 126), data caching process 10 may need to obtain content 132 identified in read request 120 from data array 130.

In this particular example, since LUN0/LBA5 is not defined within content directory 250, a local cached copy of content 132 is not present/available within first cache system 126 and data caching process 10 will be need to obtain content 132 from data array 130.

Once content 132 is obtained by data caching process 10 from data array 130, data caching process 10 may store content 132 within first cache system 126 and may provide content 132 to client application 22, thus satisfying read request 120. Additionally, content directory 250 may be amended by data caching process 10 to include an entry (e.g., entry 258) that defines the data array storage address 200/202 (e.g. LUN0/LBA5); first cache address 254 (e.g., 111110), and content identifier 256 (e.g., ab1ccba) for content 132.

As discussed above, data array 130 may include second cache system 128. Accordingly, data caching process 10 may execute the above-described functionality with respect to second cache system 128.

General Write Request Processing:

During operation of server computer/controller 100, data caching process 10 may receive write request 116 on first cache system 126, wherein write request 116 identifies new content (e.g., content 118) to be written to data array 130.

For example, assume that user 46 is using client application 22 to create content (i.e. content 118) that is to be stored on data array 130. Accordingly, client application 22 may generate write request 116 which, as discussed above, may define a particular logical unit within data array 130 (e.g., a LUN or Logical Unit Number) and a particular storage address within that specific logical unit (e.g., an LBA or Logical Block Address) for storing content 118 within data array 130.

As discussed above and depending on the manner in which first cache system 126 is configured, data caching process 10 may immediately write content 118 to data array 130 (if first cache system 126 is configured as a write-through cache) or may subsequently write content 118 to data array 130 (if first cache system 126 is configured as a write-back cache).

Assuming that first cache system 126 in this example is configured as a write-through cache, data caching process 10 may immediately write content 118 to LUN0/LBA0 within data array 130 (as defined within write request 116). Additionally, data caching process 10 may locally-store content 118 within first cache system 126 and may amend content directory 250 to include an entry (e.g., entry 260) that defines the data array storage address 200/202 (e.g. LUN0/LBA0); first cache address 254 (e.g., 001011), and content identifier 256 (e.g., acdfc1a) for content 118.

As discussed above, data array 130 may include second cache system 128. Accordingly, data caching process 10 may execute the above described functionality with respect to second cache system 128.

Content Aware Caching

As discussed above, content directory 250 may include a content identifier 256 that may be used in a content-aware caching system. A typical example of content identifier 256 may include but is not limited to a hash function of the content that content identifier 256 is associated with. Accordingly, through the use of content identifier 256 within a content-aware caching system, duplicate data entries within first cache system 126 and/or second cache system 128 may be quickly identified, avoided, and/or eliminated.

For example, upon receiving write request 116 and content 118, data caching process 10 may generate content identifier 256 for content 118. As discussed above, content identifier 256 generated for the content (i.e., content 118) identified within write request 116 may be a hash function (e.g., a cryptographic hash) of content 118.

Assume for illustrative purposes that write request 116 includes storage address 200 that defines the intended storage location for content 118 as LUN0/LBA0. Accordingly, upon receiving write request 116, data caching process 10 may generate content identifier 256 for content 118. Assume for illustrative purposes that data caching process 10 generates a hash of content 118, resulting in the generation of content identifier 256 (namely hash value acdfcla).

This newly-generated content identifier 256 (i.e. acdfcla) associated with content 118 may be compared to each of the other content identifiers (namely abalaby, alazchb, abalabz, alazcha) included within content directory 250 for first cache system 126 to determine if the newly-generated content identifier 256 (i.e. acdfcla) matches any of the other content identifiers (namely abalaby, alazchb, abalabz, alazcha) included within content directory 250.

As discussed above, each entry of the plurality of entries 252 included within content directory 250 is associated with a unique piece of content included within (in this example) first cache system 126. Accordingly, each unique content identifier included within content directory 250 may be associated with a unique piece of content written to (in this example) first cache system 126.

If, when performing this comparison, data caching process 10 does not identify a content identifier (i.e., abalaby, alazchb, abalabz, alazcha) within content directory 250 that matches the above-described, newly-generated content identifier (i.e. acdfcla), data caching process 10 may write content 118 to (in this example) first cache system 126 and may provide a copy of content 118 to data array 130 for storage within data array 130. Additionally, data caching process 10 may modify content directory 250 to include a new entry (i.e., entry 260) that defines the newly-generated content identifier (i.e. acdfcla), the location of content 118 within (in this example) first cache system 126 (i.e., 001011), and the location of content 118 within data array 130 (i.e., LUN0/LBA0).

If, when performing this comparison, data caching process 10 identified a content identifier within content directory 250 that matched the above-described, newly-generated content identifier (i.e. acdfcla), data caching process 10 would perform differently.

To illustrate how data caching process 10 would react if it found a matching content identifier, further assume for illustrative purposes that a second write request (i.e., write request 116') includes storage address 200' that defines the intended storage location for content 118' as LUN0/LBA2. Accordingly, upon receiving write request 116', data caching process 10 may generate content identifier 256 for content 118'. Assume for illustrative purposes that data caching process 10 generates a hash of content 118', resulting in the generation of content identifier 256 (namely hash value alazcha).

This newly-generated content identifier 256 (i.e. alazcha) associated with content 118' may be compared to each of the other content identifiers (namely abalaby, alazchb, abalabz, alazcha) included within content directory 250 for (in this example) first cache system 126 to determine if the newly-generated content identifier 256 (i.e. alazcha) matches any of the other content identifiers (namely abalaby, alazchb, abalabz, alazcha) included within content directory 250.

If, when performing this comparison, data caching process 10 does identify a content identifier (namely alazcha) within content directory 250 that matches the above-described, newly-generated content identifier (i.e. alazcha), data caching process 10 may perform a couple of functions.

For example, data caching process 10 may modify the entry (i.e., entry 262) within content directory 250 that is associated with the matching content identifier (i.e., alazcha) to include storage address 200' that defines the intended storage location for content 118' (i.e., LUN0/LBA2 within data array 130), thus generating modified entry 262'. Accordingly, modified entry 262' identifies that the pieces of content that are currently stored at LUN4/LBA7 and LUN0/LBA2 within data array 130 are identical. Accordingly, a single piece of cached content (located at first cache address 010111 within, in this example, first cache system 126) may be used as a local cached copy for both pieces of content stored on data array 130.

While the system is described above as modifying entry 262 by adding a second LUN/LBA designation to generate modified entry 262', this is for illustrative purposes only and is not intended to be a limitation of this disclosure, as other configurations are possible. For example, sub-tables/sub-entries may be utilized to show the manner in which multiple LUNs/LBAs are mapped to a single piece of content within, for example, first cache system 126.

As discussed above, data array 130 may include second cache system 128. Accordingly, data caching process 10 may execute the above-described content aware functionality with respect to second cache system 128.

Managing Access to LUNs

Assume for illustrative purposes that a second server computer/controller (e.g. server computer/controller 134) is also coupled to data array 130 via network infrastructure 114. Accordingly, each of server computer/controller 100 and server computer/controller 134 may gain control and relinquish control of the various logical units (e.g. LUNs) within data array 130. Further, each of server computer/controller 100 and server computer/controller 134 may write data to and read data from various storage addresses (e.g., an LBA or Logical Block Address) within the LUNs included in data array 130.

Accordingly, problems may be realized when e.g. server computer/controller 100 and server computer/controller 134 perform tasks that are in conflict with each other. For illustrative purposes, assume that a first server computer/controller (e.g. server computer/controller 100) writes a piece of content (e.g. content 118) to an address (e.g. LUN0/LBA2) within storage array 130. As discussed above, a copy of this content (e.g. content 118) will also be written to first cache system 126. Further assume that a second server computer/controller (e.g. server computer/controller 134) writes a piece of content (e.g. content 136) to the same address (e.g. LUN0/LBA2) within storage array 130. Similarly, a copy of this content (e.g. content 136) would also be written to a local cache system (e.g., cache system 138) within server computer/controller 134.

Accordingly and in this situation, if a read request is received concerning LUN0/LBA2 within data array 130, the data provided to the requester will vary depending upon which server computer/controller fulfills the request. For example, if the read request was received by server computer/controller 134, server computer/controller 134 would fulfill the read request by providing the locally-cached copy of the data (which is stored within cache system 138 of server computer/controller 134). In this situation, the data provided to the requester would be correct, in that the cached data matches the data stored at LUN0/LBA2 within data array 130.

However, if the read request was received by server computer/controller 100, server computer/controller 100 would also fulfill the read request by providing the locally-cached copy of the data (which is stored within first cache system 126 of server computer/controller 100). Unfortunately and in this situation, the data provided to the requester would be incorrect, in that the cached data does not match the data stored at LUN0/LBA2 within data array 130.

Ownership of the various LUNs included within data array 130 may be controlled via various SCSI commands, namely the Mode Select command and the Mode Sense command. As is known in the art, SCSI (i.e., Small Computer System Interface) is a set of standards for physically connecting and transferring data between computers and peripheral devices. Specifically, the SCSI standards define commands, protocols and interfaces.

The SCSI Mode Select command may be used to modify device information contained in buffers associated with a related device, wherein the SCSI Mode Sense command may be used to read the information contained in these buffers.

In order to control ownership of the various LUNs included within data array 130 via the Mode Select command and the Mode Sense command, data caching process 10 may establish a buffer (e.g., buffer 140) for each LUN included within data array 130. These buffers are typically located within data array 130 but need not be located on the physical storage device associated with the LUN. This buffer may be written to via the Mode Select command and read from via the Mode Sense command.

The Mode Select command and the Mode Sense command issued by data caching process 10 are different than traditional Mode Select and Mode Sense commands, in that data caching process 10 produces an expanded Mode Select and Mode Sense command that includes additional data in the form of a vender unique (VU) page that defines a control field that identifies the current control status for the LUN (having a possible value of 1 or 0) and a GUID field that identifies the host (i.e., the appropriate server computer/controller). The GUID for the host is typically driven by the MAC address for the host (i.e., the server computer/controller). Accordingly, the above-described buffers (e.g., buffer 140) need to be sized to accommodate these expanded Mode Select and Mode Sense commands.

Obtaining Control of a LUN

When the above-described system initially starts up, the control field within a buffer for a LUN is defined as 0 and the GUID field within a buffer for a LUN is defined as all zeros, thus indicating that no device is in control of the related LUN.

Assume for illustrative purposes that the above-described system has just started up and LUN 0 (included within data array 130) is not being controlled by any host. During this startup mode, the various hosts included within the system may attempt to obtain control of LUN 0. For example, server computer/controller 100 and server computer/controller 134 may each generate Mode Select commands in an attempt to obtain control of LUN0. For example, server computer/controller 100 may generate Mode Select command 142 that defines a control value of 1 and a GUID that identifies server computer/controller 100. Additionally, server computer/controller 134 may generate Mode Select command 144 that defines a control value of 1 and a GUID that identifies server computer/controller 134.

Data caching process 10 may receive 300 these Mode Select commands (e.g., Mode Select commands 142, 144) concerning this single LUN (e.g., LUN 0) from each of these potential hosts, namely server computer/controller 100 and server computer/controller 134.

As discussed above, each of these Mode Select commands (Mode Select commands 142, 144) defines control information and host identifier information for its related host, namely server computer/controller 100 for Mode Select command 142 and server computer/controller 134 for Mode Select command 144.

Data caching process 10 may process 302 the Mode Select commands received in a serial fashion and in accordance with the order in which the Mode Select commands were received. Accordingly, assume for illustrative purposes that Mode Select command 142 was received by data caching process 10 before Mode Select command 144. Accordingly, data caching process 10 may process 302 Mode Select command 142 before Mode Select command 144. Accordingly, the first Mode Select command received (namely Mode Select command 142) is accepted by data caching process 10 and subsequent Mode Select commands received (namely Mode Select command 144) are rejected by data caching process 10, thus defining one accepted Mode Select command (namely Mode Select command 142) and one or more rejected Mode Select commands (namely Mode Select command 144).

While in this particular example, two potential hosts are shown (namely server computer/controller 100 and server computer/controller 134), this is for illustrative purposes only and is not intended to be a limitation on this disclosure, as the number of potential hosts may be increased or decreased accordingly.

For the accepted Mode Select command (namely Mode Select command 142), the control information and host identifier information included within the accepted Mode Select command may be written 304 to buffer 140 associated with e.g. LUN 0. As discussed above, buffer 140 includes a control field and a GUID field. Accordingly, the control information included within Mode Select command 142 may be written 304 to the control field of buffer 140 and the host identifier information included within Mode Select command 142 may be written 304 to the GUID field within buffer 140.

As discussed above, data caching process 10 may identify one or more rejected Mode Select commands (namely Mode Select command 144). Accordingly, data caching process 10 may notify 306 the host associated with each of these rejected Mode Select commands (namely server computer/controller 134).

In the event that a particular LUN (e.g., LUN 0) is restarted (e.g. due to a crash or maintenance), data caching process 10 may reset 308 the control of this particular LUN to a non-controlled state. Resetting 308 control of the LUN to a non-controlled state may include populating 310 the control field within buffer 140 associated with LUN 0 with a 0 and populating 312 the GUID field within buffer 140 associated with LUN 0 with one or more zeros.

Relinquishing Control of a LUN

Assume for illustrative purposes that after gaining control of LUN 0, server computer/controller 100 no longer wishes to/needs to control LUN 0. Accordingly, server computer/controller 100 may generate a Mode Select command (Mode Select command 142) that results in server computer/controller 100 relinquishing control of LUN 0. Specifically, this Mode Select command to relinquish control of LUN 0 may include control information that identifies control as 0 and host identifier information that identifies server computer/controller 100 (the host that last had control of the LUN).

Upon receiving 350 Mode Select command 142 from server computer/controller 100, data caching process 10 may process 352 Mode Select command 142 to determine if the control information included within Mode Select command 142 signifies an intent by the host (i.e., server computer/controller 100) to relinquish control of e.g., LUN 0. As discussed above, such intent would be signified if the control information included within Mode Select command 142 identifies control as 0.

If data caching process 10 determines that the control information included within Mode Select command 142 signifies an intent to relinquish control of LUN 0, data caching process 10 may process the host identifier information included within Mode Select command 142 to confirm 354 that the host identifier information matches LUN control identifier information currently stored within buffer 140 (which defines the host that currently controls e.g., LUN 0).

As discussed above, when a particular host controls a LUN, appropriate information concerning the controlling host is written to the buffer associated with the LUN (namely buffer 140). Accordingly, if the GUID information within buffer 140 matches the host identifier information included within Mode Select command 142, the host that generated Mode Select command 142 (namely server computer/controller 100) has the authority to relinquish control of LUN 0. Therefore, the control information and/or the host identifier information included within Mode Select command 142 may be written 356 to buffer 140 to effectuate the relinquishing of control of LUN 0.

Since (as discussed above) the control information included within Mode Select command 142 is a 0, when data caching process 10 writes 356 the control information to buffer 140, data caching process 10 may merely need to write 358 a zero to the control field within buffer 140.

If the host identifier information included within Mode Select command 142 matches the LUN control identifier information currently stored within buffer 140 and, therefore, control will be relinquished by the requesting host, data caching process 10 may flush 360 the host cache associated with LUN 0. Accordingly, in the event that server computer/controller 100 successfully relinquishes control of LUN 0, data caching process 10 may flush the portion of first cache system 126 associated with LUN 0 due to server computer/controller 100 no longer controlling LUN 0 and, over time, the data included within LUN 0 will be overwritten and will no longer match the data included within first cache portion 126.

In the event that server computer/controller 100 subsequently receives a read request concerning data stored within LUN 0 (which server computer/controller 100 no longer controls), server computer/controller 100 may retrieve the data directly from LUN 0 and (as server computer/controller 100 no longer controls LUN 0) will not save a copy of the retrieved data within first cache portion 126.

In the event that the host identifier information included within Mode Select command 142 does not match the LUN control identifier information currently stored within buffer 140, the requesting host does not have the authority to relinquish control of LUN 0. Accordingly, data caching process 10 may reject 362 the Mode Select command and may notify the requesting host that their Mode Select command was rejected.

Reboot after Crash of Host

During the course of normal operations, a host (e.g. server computer/controller 100 and/or server computer/controller 134) may crash. This may be done unintentionally (e.g., due to a software malfunction) or may be done intentionally (e.g., to protect the integrity of the data stored within data array 130). For example, if a host received a write request to write data to a LUN that it was not controlling and the host processed such a request, the resulting data stored within the LUN would be corrupt, as the data stored within the LUN would not correspond to the copy of the data that was locally-cached by the host that is controlling the LUN. Accordingly, the host receiving such a write request may intentionally crash to avoid corrupting the data stored within the LUN.

Assume for illustrative purposes that server computer/controller 134 crashed and is in the process of coming back online. Accordingly, upon sensing 400 that a reboot sequence is executing on server computer/controller 134 (due to the occurrence of a crash event), data caching process 10 may determine 402 at least one LUN that was being controlled by the host (e.g. server computer/controller 134) prior to the crash event, thus define at least one target LUN.

When determining 402 which LUNs were being controlled by the host that is executing the reboot sequence, data caching process 10 may access configuration file 146 (which may be stored within data array 130) that defines which hosts have control of which LUNs). Accordingly and in response to server computer/controller 134 executing the reboot sequence, data caching process 10 may simply access configuration file 146 and look up server computer/controller 134 to determine which LUNs server computer/controller 134 was controlling at the time of the crash event.

Assume for illustrative purposes that server computer/controller 134 was only controlling a single LUN (namely LUN 1) at the time of the crash event. Accordingly, data caching process 10 may prepare 404 a Mode Select command (e.g., Mode Select command 144) for the target LUNs, which in this example is only LUN 1. As discussed above, Mode Select command 144 may define control information and host identifier information concerning the host (e.g., server computer/controller 134) Accordingly and in this example, the control information would be a 1 (as server computer/controller 134 wishes to regain control of LUN 1) and the host identifier information would identify server computer/controller 134.

Data caching process 10 may process 406 Mode Select command 144 to determine if the control information and host identifier information included within Mode Select command 144 matches control information and host identifier information included within a buffer (e.g. buffer 148) associated with the target LUN (e.g., LUN 1). If the control information and host identifier information included within Mode Select command 144 matches the control information and host identifier information included within buffer 148, data caching process 10 may grant 408 control of the target LUN (i.e., LUN 1) to the requesting host (namely server computer/controller 134).

As discussed above, when a particular host controls a LUN, appropriate information concerning the controlling host is written to the buffer associated with the LUN (namely buffer 148). Accordingly, if the GUID information within buffer 148 matches the host identifier information included within Mode Select command 144, the host identified within Mode Select command 144 (namely server computer/controller 134) may regain control of LUN 1.

If the control information and host identifier information included within Mode Select command 144 does not match the control information and host identifier information included within buffer 148, data caching process 10 may deny 410 the requesting host control of the target LUN (e.g., LUN 1) and may notify 412 the requesting host of the denial.

Obtaining Control of LUN after Death of Host

Assume for illustrative purposes that server computer/controller 134 regains control of LUN 1. However, subsequent to regaining control, server computer/controller 134 suffers a system board failure and, therefore, for the purposes of this example is considered to be offline (i.e., dead). As server computer/controller 134 is dead, it cannot relinquish control of LUN 1 in the manner described above. Further, assume for illustrative purposes that server computer/controller 100 wishes to obtain control of LUN 1 (which is currently being controlled by server computer/controller 134, which is dead).

Accordingly, server computer/controller 100 may prepare a Mode Select command (e.g., Mode Select command 142) to obtain control of LUN 1 (i.e., to seize control away from "dead" server computer/controller 134). When preparing Mode Select command 142, the control information may be defined as 0 and the host identifier information may identify server computer/controller 100.

Upon receiving 450, Mode Select command 142 from server computer/controller 100 concerning LUN 1 (which is currently being controlled by server computer/controller 134), data caching process 10 may process 452 Mode Select command 142 to determine if the control information and host identifier information included within Mode Select command 142 signifies an intent by e.g. server computer/controller 100 to seize control of LUN 1 from server computer/controller 134.

When determining if there is an intent to seize control of LUN 1 from server computer/controller 134, data caching process 10 may determine if Mode Select command 142 includes control information set to 0 and includes host identifier information that identifies a host other than the host that is currently controlling LUN 1. Since LUN 1 is currently being controlled by server computer/controller 134 and the host identifier information included within Mode Select command 142 identifies server computer/controller 100, data caching process 10 will determine that there is an intent to seize control of LUN 1 from server computer/controller 134.

Since the control information and host identifier information signifies an intent to seize control of LUN 1 from server computer/controller 134, the control information and host identifier information included within Mode Select command 142 may be written 454 to buffer 148 (which is associated with LUN 1). When writing 454 control information and host identifier information included within Mode Select command 142, data caching process 10 may simply write 456 a zero to the control field included within buffer 148.

When a host controls a LUN, the host will typically "check in" periodically (e.g. every two minutes) to show that they are still "alive" and controlling the LUN (as opposed to being dead). These hosts may "check in" using the above-described Mode Sense command to determine the status of e.g., buffer 148.

Accordingly and in the event that a host is indeed alive, upon using the Mode Sense command (which reads the content of the buffer associated with the LUN), the host will be able to see if control of the LUN was taken away. And if control was taken away, data caching process 10 may allow 458 the host in question to use a Mode Select command (in the manner described above) to regain control of the LUN. However, in the event that a host is "dead" such inquiries (in the form of a Mode Sense command) and such control corrections (in the form of a Mode Select command) will not be made on behalf of the "dead" host.

Accordingly and continuing with the above-stated example, once server computer/controller 100 issues Mode Select command 142 to seize control of LUN 1 from server computer/controller 134, server computer/controller 100 may rest until after the expiry of a defined verification period. The length of this verification period is longer than the frequency at which a host "checks in". As discussed above and in this example, a host who is in control of a LUN "checks in" every two minutes. Accordingly, a suitable length for the above-described verification period may be six minutes, which is long enough for (in this example) server computer/controller 134 to "check in" and make their existence be known.

After the expiration of this verification period, data caching process 10 may read 458 (via a Mode Sense command) the content of buffer 148 (i.e. the buffer associated with LUN 1). In the event that server computer/controller 134 is still viable (i.e., alive), server computer/controller 134 would have "checked in" during the verification period, noticed the changes made to buffer 148 by server computer/controller 100, and issued a Mode Select command to correct the same and reestablish control of LUN 1. Accordingly, if data caching process 10 determines that buffer 148 was modified by server computer/controller 134 during the verification period, data caching process 10 may deem server computer/controller 134 still viable (i.e., alive) and may abort 462 the attempt by server computer/controller 100 to seize control of LUN 1 from server computer/controller 134. If, however, data caching process 10 determines that buffer 148 was not modified by server computer/controller 134 during the verification period, data caching process 10 may deem server computer/controller 134 not viable (i.e., dead) and may transfer 464 control of LUN 1 from server computer/controller 134 to server computer/controller 100.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    determining at least one LUN that was being controlled by a host prior to a crash event concerning the host, thus define at least one target LUN;
    preparing a Mode Select command for the at least one target LUN, wherein the Mode Select command defines control information and host identifier information concerning the host;
    processing the Mode Select command to determine if the control information and host identifier information included within the Mode Select command matches control information and host identifier information included within a buffer associated with the at least one target LUN; and
    if the control information and host identifier information included within the Mode Select command matches the control information and host identifier information included within the buffer, granting control of the at least one target LUN to the host.

2. The computer-implemented method of claim 1 further comprising:
    if the control information and host identifier information included within the Mode Select command does not match the control information and host identifier information included within the buffer, denying control of the at least one target LUN to the host.

3. The computer-implemented method of claim 1 further comprising:
    if the control information and host identifier information included within the Mode Select command does not match the control information and host identifier information included within the buffer, notifying the host.

4. The computer-implemented method of claim 1 further comprising:
    sensing the execution of a reboot sequence of the host after the crash event.

5. The computer-implemented method of claim 1 wherein the at least one target LUN is included within a data array.

6. The computer-implemented method of claim 5 wherein the data array includes one or more electro-mechanical storage devices.

7. The computer-implemented method of claim 1 wherein the host is an application server.

8. A computer program product residing on a non-transitory computer readable medium having a plurality of instructions stored thereon which, when executed by a processor, cause the processor to perform operations comprising:
    determining at least one LUN that was being controlled by a host prior to a crash event concerning the host, thus define at least one target LUN;
    preparing a Mode Select command for the at least one target LUN, wherein the Mode Select command defines control information and host identifier information concerning the host;
    processing the Mode Select command to determine if the control information and host identifier information included within the Mode Select command matches control information and host identifier information included within a buffer associated with the at least one target LUN; and
    if the control information and host identifier information included within the Mode Select command matches the control information and host identifier information included within the buffer, granting control of the at least one target LUN to the host.

9. The computer program product of claim 8 further comprising instructions for:
    if the control information and host identifier information included within the Mode Select command does not match the control information and host identifier information included within the buffer, denying control of the at least one target LUN to the host.

10. The computer program product of claim 8 further comprising instructions for:
    if the control information and host identifier information included within the Mode Select command does not match the control information and host identifier information included within the buffer, notifying the host.

11. The computer program product of claim 8 further comprising instructions for:
    sensing the execution of a reboot sequence of the host after the crash event.

12. The computer program product of claim 8 wherein the at least one target LUN is included within a data array.

13. The computer program product of claim 12 wherein the data array includes one or more electro-mechanical storage devices.

14. The computer program product of claim 8 wherein the host is an application server.

15. A computing system including at least one processor and at least one memory architecture coupled with the at least one processor, wherein the computing system is configured to perform operations comprising:
    determining at least one LUN that was being controlled by a host prior to a crash event concerning the host, thus define at least one target LUN;

preparing a Mode Select command for the at least one target LUN, wherein the Mode Select command defines control information and host identifier information concerning the host;

processing the Mode Select command to determine if the control information and host identifier information included within the Mode Select command matches control information and host identifier information included within a buffer associated with the at least one target LUN; and if the control information and host identifier information included within the Mode Select command matches the control information and host identifier information included within the buffer, granting control of the at least one target LUN to the host.

16. The computing system of claim 15 further configured to perform operations comprising:

if the control information and host identifier information included within the Mode Select command does not match the control information and host identifier information included within the buffer, denying control of the at least one target LUN to the host.

17. The computing system of claim 15 further configured to perform operations comprising:

if the control information and host identifier information included within the Mode Select command does not match the control information and host identifier information included within the buffer, notifying the host.

18. The computing system of claim 15 further configured to perform operations comprising:

sensing the execution of a reboot sequence of the host after the crash event.

19. The computing system of claim 15 wherein the at least one target LUN is included within a data array.

20. The computing system of claim 19 wherein the data array includes one or more electro-mechanical storage devices.

21. The computing system of claim 15 wherein the host is an application server.

* * * * *